(12) United States Patent
Tan et al.

(10) Patent No.: US 9,165,607 B2
(45) Date of Patent: *Oct. 20, 2015

(54) MOUNTING STRUCTURE FOR COMPONENT OF ELECTRONIC DEVICE

(75) Inventors: Cheng Ping Tan, Fremont, CA (US); Con Phan, Milpitas, CA (US); Steven Lee Owen, San Jose, CA (US); Michael D. Hillman, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 537 days.

This patent is subject to a terminal disclaimer.

(21) Appl. No.: 13/484,079

(22) Filed: May 30, 2012

(65) Prior Publication Data
US 2012/0236436 A1 Sep. 20, 2012

Related U.S. Application Data

(63) Continuation of application No. 12/641,947, filed on Dec. 18, 2009, now Pat. No. 8,223,482.

(51) Int. Cl.
*G06F 1/16* (2006.01)
*G11B 33/08* (2006.01)
*F16F 1/371* (2006.01)
*F16F 1/376* (2006.01)
*F16F 1/42* (2006.01)
*G06F 1/18* (2006.01)

(52) U.S. Cl.
CPC ............... *G11B 33/08* (2013.01); *F16F 1/371* (2013.01); *F16F 1/376* (2013.01); *F16F 1/428* (2013.01); *G06F 1/187* (2013.01)

(58) Field of Classification Search
CPC .......... G06F 1/18; G06F 1/181; G06F 1/183; G06F 1/187; G11B 33/08; G11B 33/121
USPC ............. 361/679.33, 679.34, 679.43, 679.35, 361/679.36
See application file for complete search history.

(56) References Cited

U.S. PATENT DOCUMENTS

| 6,005,768 | A  | * | 12/1999 | Jo ........................... 361/679.34 |
| 6,496,362 | B2 | * | 12/2002 | Osterhout et al. ....... 361/679.34 |
| 6,504,710 | B2 | * | 1/2003  | Sutton et al. ............. 361/679.41 |
| 6,532,152 | B1 | * | 3/2003  | White et al. .................. 361/692 |
| 7,518,859 | B2 | * | 4/2009  | Kobayashi ............... 361/679.34 |
| 7,643,243 | B2 | * | 1/2010  | Lee et al. ................... 360/97.19 |
| 8,223,482 | B2 | * | 7/2012  | Tan et al. ................. 361/679.34 |
| 2006/0075509 | A1 | * | 4/2006 | Kishon ........................... 726/34 |
| 2007/0008697 | A1 | * | 1/2007 | Choi et al. ..................... 361/685 |
| 2007/0230037 | A1 | * | 10/2007 | Ichikawa et al. ........... 360/97.02 |

* cited by examiner

*Primary Examiner* — Anthony Haughton
(74) *Attorney, Agent, or Firm* — Fish & Richardson P.C.

(57) ABSTRACT

A portable electronic device having an outer housing, a component, and a shock-absorption assembly is disclosed. A shock-absorption assembly located within the outer housing and coupled to the component can include one or more elements adapted to dampen a mechanical shock to the component. The shock-absorption assembly elements can be mounted to corners and/or edges of the component. Shock-absorption assembly elements can include a first portion comprising protrusions that provide initial damping of the mechanical shock and a second portion comprising an elastic block that provides final damping of the mechanical shock.

19 Claims, 6 Drawing Sheets

MOUNTING STRUCTURE FOR COMPONENT OF ELECTRONIC DEVICE

CROSS REFERENCE TO RELATED APPLICATIONS

This is a Continuation application that claims priority to co-pending and commonly owned U.S. patent application Ser. No. 12/641,947, filed Dec. 18, 2009, by Tan et al., entitled "PORTABLE HARD DRIVE AND MOUNTING STRUCTURE FOR SAME," which is incorporated by reference in its entirety and for all purposes herein.

TECHNICAL FIELD

The present invention relates generally to computer storage devices, and more particularly to methods and systems for damping physical shocks to portable computer storage devices.

BACKGROUND

A hard disk drive ("HDD") is a common electro-mechanical storage device that is used in many computers and consumer electronic devices. Most HDDs are designed to be installed on the inside of an associated computer or electronic device, and most are manufactured to one of a select few standardized sizes and shapes, otherwise known as "form factors." Such standardized form factors are important for compatibility purposes between the numerous manufacturers and users of HDDs, computers, electronic devices and other associated components. Examples of generally well known HDD form factors include the 5.25 inch, 3.5 inch, and 2.5 inch form factors, although several others do exist.

An HDD is typically a relatively fragile device that can experience handling and physical/mechanical shock damage, such as in the case of a dropped device, even where a user is careful. Such handling or shock damage can severely reduce the operating life of the associated computer or consumer electronic device, and may also result in the loss of data from the HDD itself. As might be expected, a laptop or other portable computer or consumer electronic device is typically subjected to more user handling and mechanical shocks than a desktop computer or other non-portable computing device. Where an HDD is incorporated into a laptop or other portable electronic device, then mounting designs that enhance mechanical shock tolerances are preferable. Mounting designs can be challenging for such portable devices, however, and the lack of effective mounting designs to adequately damp physical or mechanical shocks has traditionally limited HDD form factors choices for portable computing devices. For example, most laptop computers today utilize the standardized 2.5 inch form factor for their incorporated HDDs.

Although the 2.5 inch HDD form factor is quite popular for portable computing devices, there are limitations that arise where a manufacturer or user is limited to an HDD having such a form factor over a more robust HDD, such as, for example, a 3.5 inch form factor HDD. Notably, the storage capacity of a 3.5 inch form factor HDD is significantly improved over that of the smaller 2.5 inch form factor HDD. Not surprisingly, 3.5 inch form factor HDDs tend to be more popular in desktop computers and other non-portable electronic devices. As is generally well known, the standardized 3.5 inch form factor calls for HDD outer dimensions of a width of 4.0 inches, a depth of 5.75 inches, and a height that can be either 1.0 or 1.63 inches. In comparison, the standardized 2.5 inch form factor calls for HDD outer dimensions of a width of 2.75 inches, a depth of 3.94 inches, and a height that can be any of 0.37, 0.49, 0.67 or 0.75 inches.

Another feature that favors the 2.5 inch HDD form factor for portable electronic devices is the actual size of the HDD itself. A major driver in the design of portable computers and other portable electronic devices is overall device size, and a 2.5 inch form factor HDD is simply smaller than a 3.5 inch form factor HDD. Sway space allocated for HDD mounting must be minimized as well in any drive to design devices with minimize overall sizes. Unfortunately, mountings to damp physical shocks typically need to be larger to accommodate for greater shock forces in larger devices, which then adds even more size to the overall device where larger HDDs are used. Industry has thus gravitated toward the 2.5 HDD form factor for portable electronic devices, due in large part to the practical considerations of overall smaller size and the traditional inability to adequately mount larger form factor HDDs to damp mechanical shocks and other handling issues within a reasonably sized space.

While many designs and techniques used to mount HDDs in portable computers and other portable electronic devices have generally worked well in the past, there is always a desire to provide further designs and techniques for mounting portable device HDDs. In particular, improved mounting structures that allow for the use of 3.5 inch form factor HDDs in portable electronic devices while also sufficiently damping mechanical shocks to the HDD are desired. In addition, improved designs that further minimize the overall size dimensions of a portable electronic device having an incorporated HDD are desired.

SUMMARY

It is an advantage of the present invention to provide relatively small portable electronic devices having 3.5 inch form factor HDDs that are adequately mounted for damping mechanical shocks. This can be accomplished at least in part through the use of one or more specially designed mounting wedges that are located on the corners and/or sides of the HDD itself. It is an additional advantage of the present invention to provide portable electronic devices having 3.5 inch form factor HDDs having an overall height and width that are both less than 4.0 inches. This can be accomplished at least in part by mounting the HDD in a generally diagonal manner within the overall device.

In various embodiments, a portable computing device can include an outer housing configured to enclose and support one or more internal components, an HDD located within the outer housing and having a standardized HDD form factor, and a mounting assembly located within the outer housing and mounted or otherwise coupled to the HDD. The mounting assembly can have one or more components adapted to damp a mechanical shock to the HDD, and such components can include a first stage spring portion and a second stage spring portion, wherein the damping properties of the first and second stage spring portions are significantly different. The first stage spring portion can comprise an extended finger geometry that provides initial damping of a mechanical shock, while the second stage spring portion can comprise an elastic block that provides final damping of the mechanical shock.

In addition, the outer housing can have or define a width, depth and height, such that the dimensions of at least two of the outer housing width, depth and height are less than the width and height dimensions of the standardized HDD form factor. This can be accomplished by mounting the HDD within the outer housing in a diagonal manner. For example, the HDD can be diagonally mounted within the outer housing such that the width of the HDD traverses both the width and the height of the outer housing.

In various detailed embodiments, the HDD can have a standardized HDD form factor of 3.5 inches. In such instances, the width of the HDD can be about four inches, while the depth of the HDD can be over five inches, such as 5.75 inches. In such instances, the outer housing can also have a depth of over five inches, such as 5.75 inches, but the outer housing can also have a width and a height that are both less than about four inches, due to the diagonal mounting arrangement.

In various embodiments, one or more mounting assembly components can comprise a plurality of mounting wedges that are mounted or otherwise coupled to corners and/or edges of the HDD itself. In some embodiments, such mounting wedges can be removably mounted or coupled to the HDD corners and/or edges. In some embodiments, the one or more mounting assembly components can be formed from a rubber or elastomer based material that is elastic in nature and possesses various damping properties. In particular embodiments, there can be four separate mounting wedges coupled to four separate corners of the HDD. In some embodiments, the first stage spring portion and second stage spring portion of a mounting wedge or other mounting assembly component can both be formed from the same material. In some embodiments, the extended finger geometry of the first stage spring portion can extend in a plurality of separate directions that are perpendicular to each other. Some embodiments can involve the extended finger component extending in three separate directions that are all mutually perpendicular with respect to each other.

In various further embodiments, just a mounting assembly adapted for use with a hard disk drive situated within an associated electronic device is provided. The mounting assembly can simply include a first portion having a first stage spring property, said first portion comprising an extended finger geometry that provides initial damping of a mechanical shock to the hard disk drive, and also a second portion having a second stage spring property, said second portion comprising an elastic block with damping characteristics that provides damping of the mechanical shock. Again, the damping properties of the first stage spring portion and second stage spring portion can be significantly different. In some embodiments, the mounting assembly can include a plurality of separate components, wherein each separate component includes its own first and second portions. In some embodiments, the first and second portions can be integrally formed within a single component. In some embodiments, the extended finger geometry of the first stage spring portion can extend in three separate directions that are all mutually perpendicular with respect to each other.

In still further embodiments, a data backup device can include an outer housing, an HDD mounted within the outer housing, and a mounting assembly located within the outer housing and coupled to the HDD, wherein the mounting assembly has one or more components adapted to damp a mechanical shock to the HDD. The HDD can have a standardized HDD form factor, and the dimensions of at least two of the outer housing width, depth and height are set to be less than both of the width and height dimensions of the standardized HDD form factor. Mounting arrangements of the HDD within the outer housing to accommodate these dimensions can be generally diagonal in nature, such as that which is set forth above. Further, the HDD can be adapted to communicate with and provide storage backup for a larger computing device having a substantial amount of data.

In any or all of the foregoing embodiments, a separate mounting assembly component or wedge can be provided for each corner of the HDD. Alternative arrangements can involve extensions along HDD edges, or a separate mounting assembly component or wedge for each side edge of the HDD. Alternatively, a unibody mounting assembly can be used, where the entire set of components or wedges all combine to form a single piece around the HDD. In various embodiments, the mounting assembly is mounted to the HDD such that the HDD is prevented from directly contacting the outer housing before, during and after said mechanical shock. A corresponding sway space between the HDD and the outer housing of the overall device can be created thereby.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive apparatuses and methods for providing hard disk drive ("HDD") mounting structures for portable electronic devices. These drawings in no way limit any changes in form and detail that may be made to the invention by one skilled in the art without departing from the spirit and scope of the invention.

DETAILED DESCRIPTION

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The present invention generally relates in various embodiments to portable electronic devices having internal HDDs. One particular example of such an existing portable electronic device can be the Time Capsule product provided by Apple, Inc. of Cupertino, Calif., although there are numerous other examples of portable electronic devices having internal HDDs. Unlike various traditional portable computing and electronic devices having internal HDDs, however, the devices and designs of the present invention enable the use of larger form factor HDDs within devices having smaller overall dimensions and improved mechanical shock damping properties. Although the following specific embodiments have been described with respect to a HDD having a 3.5 inch form factor for purposes of illustration and discussion, it will be readily appreciated that HDDs having other form factors may also be used with the same or similar mounting structures and principles. In addition, although the following specific embodiments have been described with respect to a time capsule or data backup device for purposes of illustration and discussion, it will be readily appreciated that the same inventive features and concepts can be used for numerous other portable electronic devices having internal HDDs.

Portable Hard Disk Drive

Figure 1A:
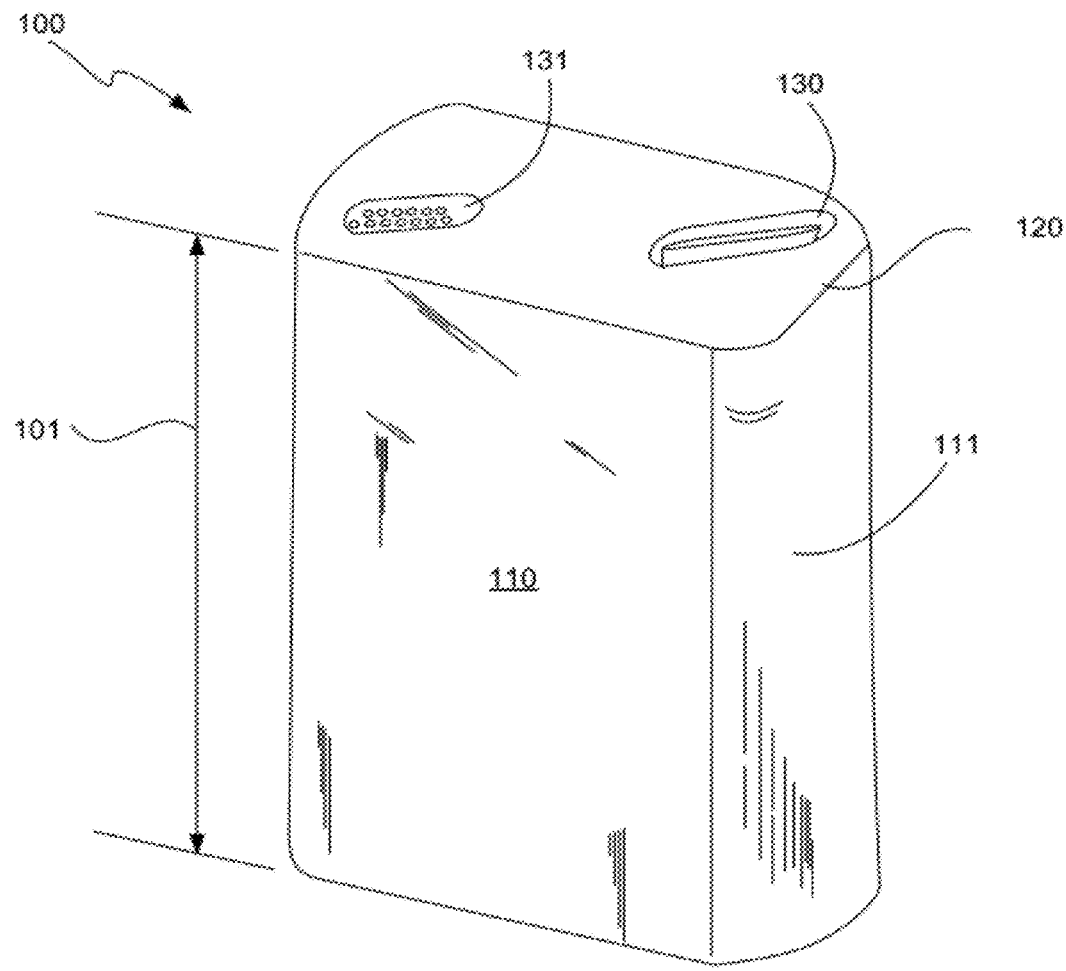
FIG. 1A illustrates in front perspective view an exemplary portable electronic device suitable for containing an internal HDD according to one embodiment of the present invention.
Figure 1B:
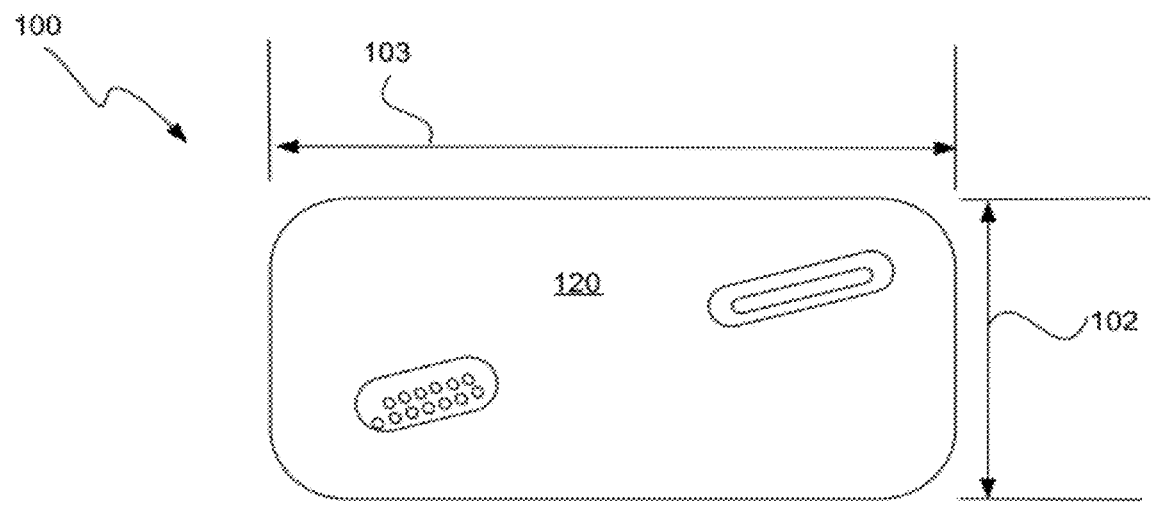
FIG. 1B illustrates in top plan view the exemplary portable electronic device of FIG. 1A according to one embodiment of the present invention.

Referring first to FIGS. 1A and 1B, an exemplary portable electronic device suitable for containing an internal HDD is illustrated in front perspective and top plan views respectively according to one embodiment of the present invention. Portable electronic device 100 can be a "time capsule" type device designed to provide backup or mass storage of data for another computer or computing system, although it will be understood that such a device can be any portable computing or electronic device having an internal HDD. For purposes of simplicity in discussion, the primary function of the portable electronic device 100 provided here is simply to provide data backup, such that the internal HDD is a dominating component of the overall device.

Portable electronic device 100 can have an outer housing comprising a front face 110, side wall 111 and top face 120, and may be generally cube or block shaped in nature. Various interfacing power supplies, ports or other such items can be conveniently located on one or more faces or surfaces of device 100. As shown, an exemplary USB port 130 and pin-out port 131 are provided on top face 120, and other similar interfacing items not shown may also exist. Portable electronic device 100 generally defines a depth 101, height 102 and width 103, which dimensions can be significant given the desire to provide portable devices that are as small as possible. Although a general rectangular shape defined by a width 103 that is somewhat larger than the height 102 for device 100 is illustrated, it will be readily appreciated that other dimensional ratios and shapes may also be used. For example, height 102 and width 103 can be substantially similar, such that a generally square footprint is created with respect to these the height and width aspects of device 100.

Figure 2A:
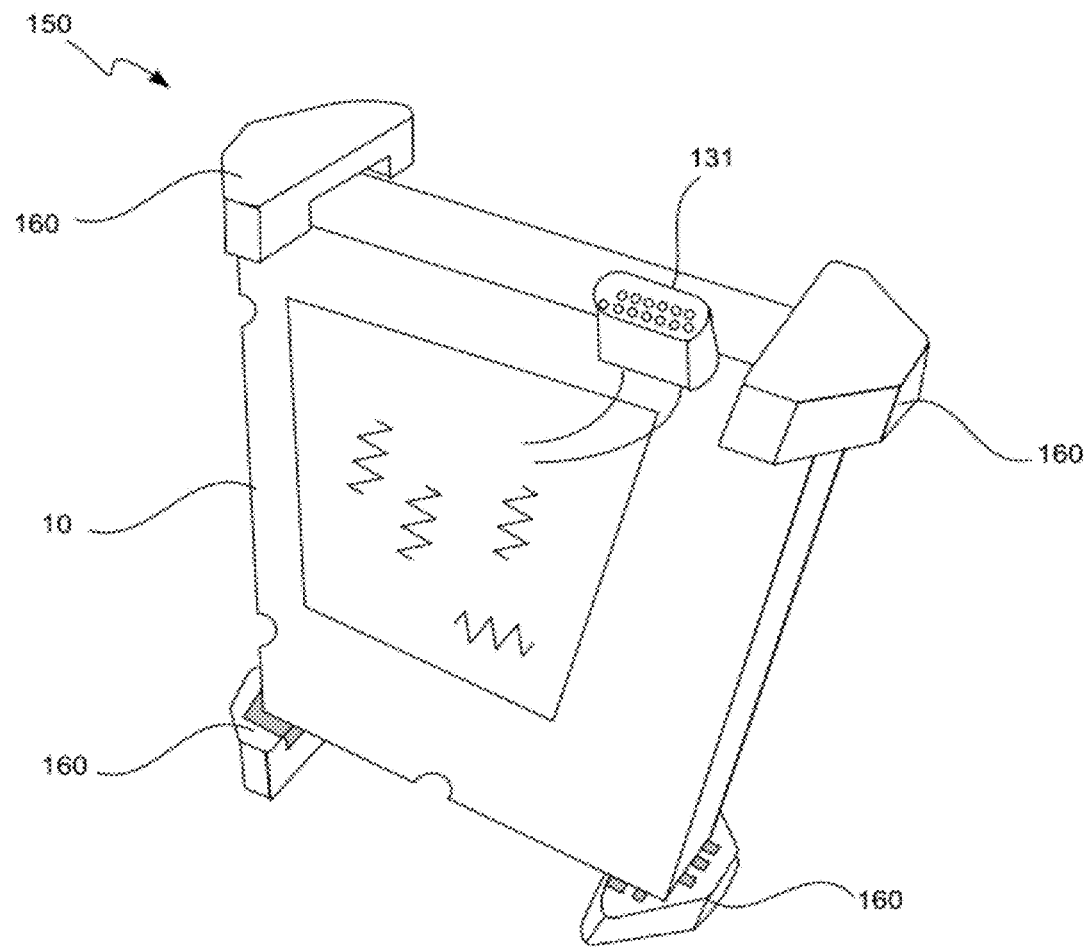
FIG. 2A illustrates in top perspective view an exemplary HDD assembly comprising an HDD and a plurality of mounting wedges located on the corners thereof according to one embodiment of the present invention.

Turning now to FIG. 2A, an exemplary HDD assembly comprising an HDD and a plurality of mounting wedges located on the corners thereof is illustrated in top perspective view. HDD assembly 150 is preferably designed such that the full assembly fits snugly within the outer housing of a portable electronic device. HDD assembly generally includes an HDD 10 and one or more mounting wedges 160 that are mounted or otherwise coupled to the various HDD corners. In the illustrated embodiment, there are four mounting wedges 160, with one being located on each corner of the four-cornered HDD 10. As will be readily appreciated, HDD 10 itself can be any of numerous commercially provided HDDs having a standardized form factor. In some embodiments, the mounting wedges 160 and remainder of an associated portable electronic device can be designed to interact with numerous HDDs having the same form factor.

Figure 2B:
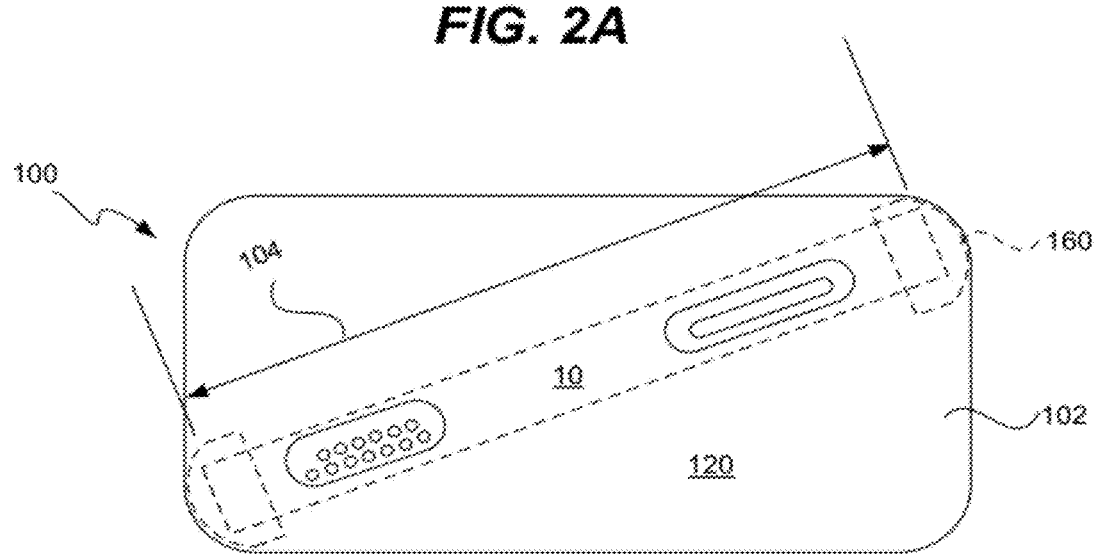
FIG. 2B illustrates in top plan view the exemplary HDD assembly of FIG. 2A installed within the exemplary portable electronic device of FIGS. 1A and 1B according to one embodiment of the present invention.

Moving next to FIG. 2B, the exemplary HDD assembly of FIG. 2A is shown as being installed within the exemplary portable electronic device of FIGS. 1A and 1B in top plan view according to one embodiment of the present invention. Portable electronic device 100 again includes various walls (not shown), as well as lid 120 having interface openings for power supplies, pin-out and USB ports and the like. HDD 10 is mounted within the outer housing of device 100 in a diagonal manner as shown, such that the width 104 of HDD 10 generally traverses both the height 102 and width 103 of the overall device 100. As will be readily understood, this can result in an arrangement where the width 104 of HDD 10 is greater than both the height 102 and width 103 of overall device 100. For example, in an arrangement where the overall device 100 has a height 102 and width 103 that are substantially equal, then a generally square footprint with respect to these dimensions is created. An HDD 10 that is diagonally mounted or positioned within the portable electronic device 100 as shown could then have a width 104 that approaches up to 1.4 times the height 102 and width 103 of device 100.

As one particular example, HDD 10 can have a standardized form factor of 3.5 inches. As is generally well known in the art, this means that the width 104 of HDD 10 is about 4.0 inches. Since a square having a diagonal of 4.0 inches has sides that are about 2.85 inches, the resulting dimensions 102 and 103 can approach this significantly lower distance with respect to the HDD width 104. Due to various practical considerations for HDD height, sway space, and material thicknesses for the mounting wedges 160 and walls of the outer housing, the actual realized height and width 102, 103 for overall device 100 having an internal 3.5 inch form factor HDD can approach about 3 inches. Of course, the distance for height 102 or width 103 must necessarily grow larger where a square footprint tends toward a more rectangular footprint, as will be readily understood. In any event, the height 102 and width 103 dimensions for a portable electronic device 100 having a square or relatively balanced rectangular height to width footprint are both significantly smaller than the standardized width 103 of four inches for a 3.5 inch form factor HDD.

The end result is that a more streamlined and smaller overall portable electronic device 100 can be implemented having the more preferable 3.5 inch form factor HDD from a memory capacity standpoint. Since the standard depth of a 3.5 inch form factor HDD is about 5.75 inches, the potential set of minimum outer dimensions for a portable electronic device 100 having an internal 3.5 inch form factor HDD can be less than 4×4×6 inches. Of course, added distance considerations for materials thicknesses, mounting structures and sway spaces can increase these dimensions somewhat. Nevertheless, at least two of the depth, height and width dimensions of portable electronic device 100 are significantly smaller than the width of a standardized form factor HDD installed therein.

Mounting Wedges

In order for a portable electronic device having an internal HDD to be suitable for commercial consumption, however, then additional considerations must be made for absorbing or damping mechanical shocks, such as when the device is jostled, dropped or otherwise handled roughly. Accordingly, additional components are needed to buffer or damp mechanical shocks, and such additional shock damping components do add further distances to the foregoing idealized dimensions. As noted above, traditional shock damping components have typically added too much distance to the overall device dimensions, such that the use of larger form factor HDDs in portable electronic devices has been limited. Further innovation in the design of physical or mechanical shock dampers can result in improved shock damping using minimized amounts of shock damping materials and their corresponding reduced distances that reduce the overall size of the device.

Figure 3A:
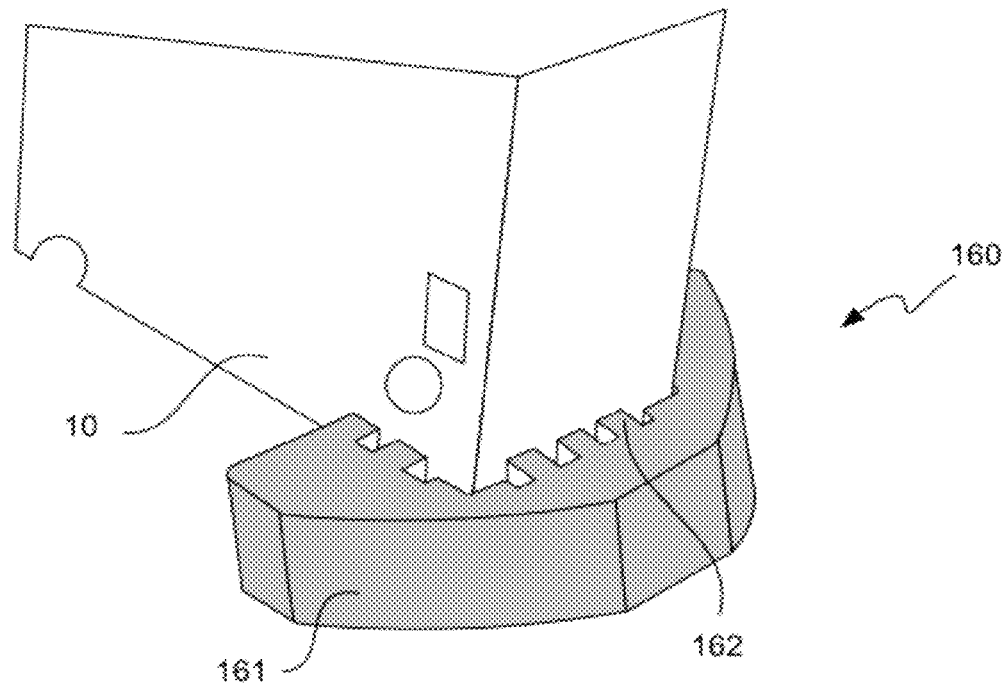
FIG. 3A illustrates in close-up side perspective view an exemplary mounting wedge positioned onto a corner of an HDD according to one embodiment of the present invention.

FIG. 3A illustrates in close-up side perspective view an exemplary mounting wedge positioned onto a corner of an HDD according to one embodiment of the present invention. As shown, mounting wedge 160 is mounted or otherwise coupled to a corner of HDD 10. Additional identical or similar mounting wedges may be used for each of the corners of HDD 10. Mounting wedge 160 can be formed from a rubber or elastomer based material suitable for absorbing mechanical shocks. Other suitable materials may also be used to form mounting wedge 160, and it will be readily appreciated that such materials should have some amount of elasticity and damping characteristics, and thus mechanical shock absorption properties. In various alternative embodiments (not shown), one or more mounting wedges 160 can extend along or be mounted or coupled to the sides of HDD 10 in addition to or instead of to the HDD corners. In some embodiments (not shown), a unibody mounting wedge frame can be mounted with respect to multiple sides and/or corners of HDD 10, as will be appreciated.

Mounting wedge 160 preferably has a geometry and material makeup that readily lends itself to the adequate damping of mechanical shocks in many or all directions. In this regard, the material of mounting wedge 160 is preferably elastic with damping characteristics in many or all directions, at least with respect to a base or wedge block portion 161 of the mounting wedge. In addition, a plurality of extended finger type components 162 can be provided in a plurality of orthogonal or perpendicular directions. The various spring and shock damping effects of the base or wedge block portion 161 and the extended finger type portions 162 of mounting wedge 160 are provided in greater detail below.

Figure 3B:
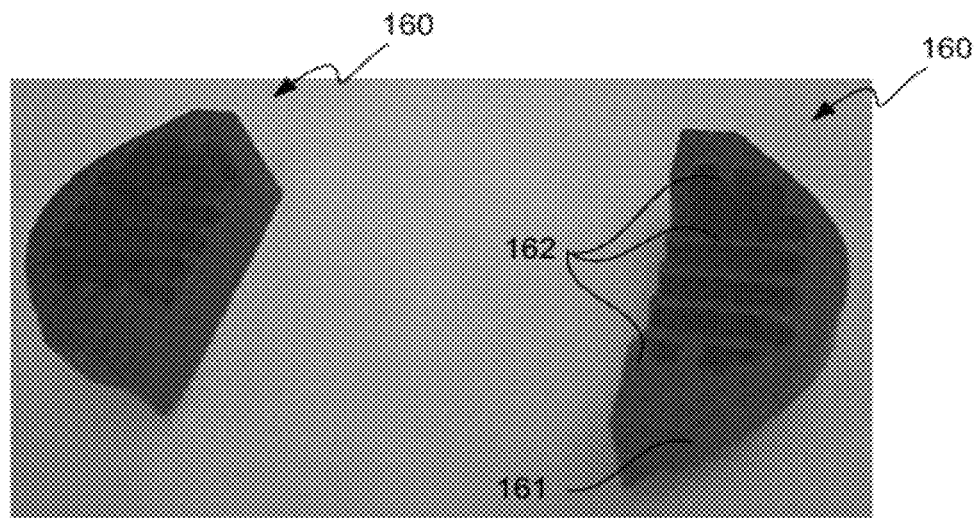
FIG. 3B illustrates in top perspective view a picture of an exemplary pair of opposing mounting wedges according to one embodiment of the present invention.

Continuing with FIG. 3B, an exemplary pair of opposing mounting wedges is illustrated in a picture in top perspective view. Mounting wedges 160 can be identical or similar to each other, and each mounting wedge can have its own separate base or wedge block portion 161 and extended finger geometry portion 162. It will be readily understood that both mounting wedges 160 can be separately mounted or otherwise coupled to two corners of an associated HDD. Furthermore, a second pair of identical or similar mounting wedges can be used for two more corners of the associated HDD, similar to that which is shown in FIG. 2A. In various embodiments, mounting wedges 160 can be dimensioned and formed from a suitable material such that each mounting wedge can be removably slipped onto or off from a respective HDD corner. A glue, tape or other adhesive may be used to help mount or affix a mounting wedge to an associated HDD, although such adhesives may not be necessary in some cases. For example, an appropriately dimensioned mounting wedge can have inner surfaces that facilitate a slide or fit onto a standardized HDD corner, as well as outer surfaces that facilitate a snug or press fit within the outer housing of an associated portable electronic device.

Figure 4A:
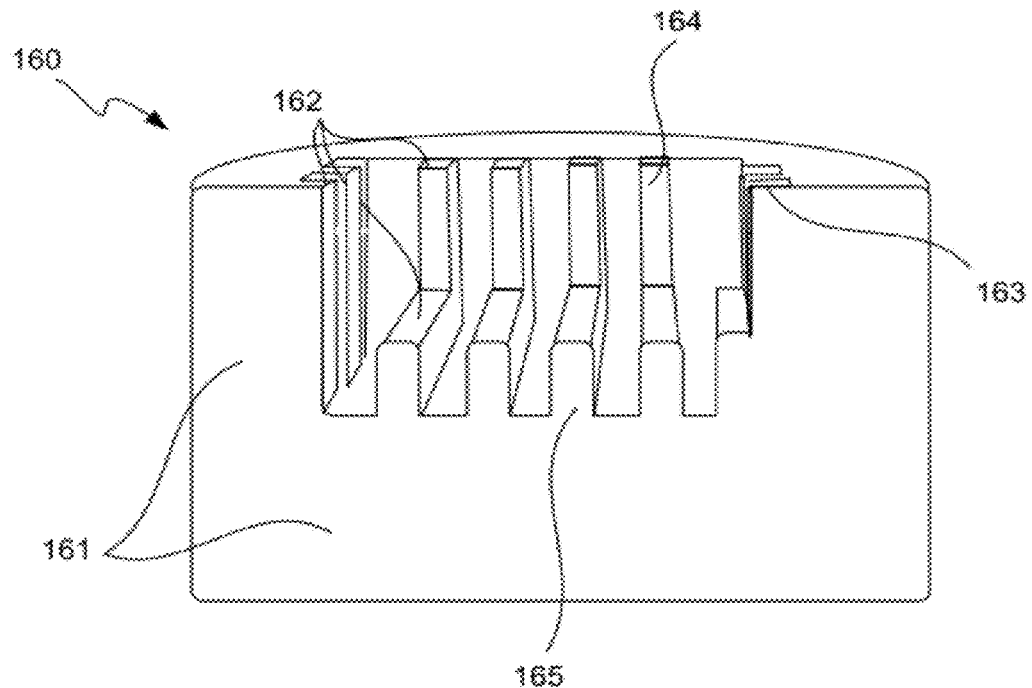
FIG. 4A illustrates in side elevation view an exemplary mounting wedge having an extended finger geometry according to one embodiment of the present invention.
Figure 4B:
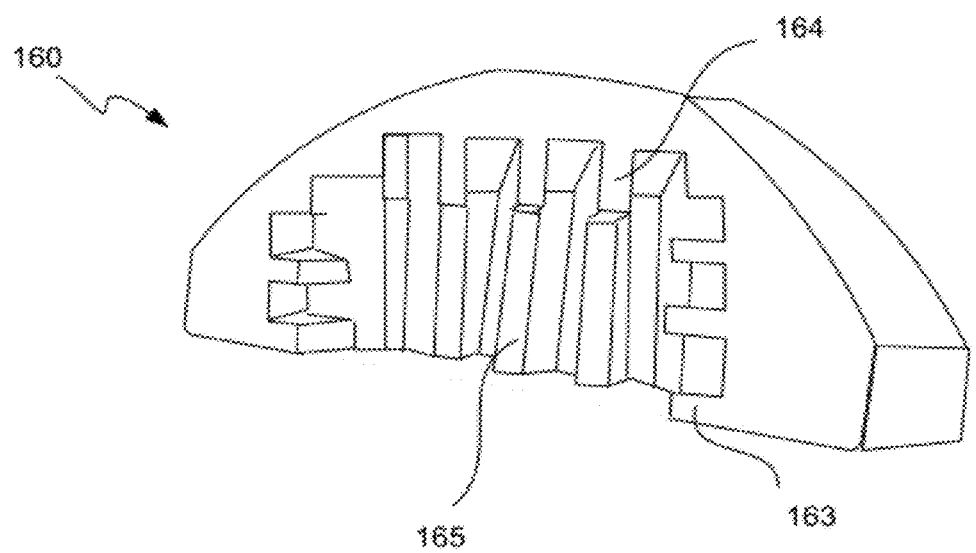
FIG. 4B illustrates in top plan view the exemplary mounting wedge of FIG. 4A according to one embodiment of the present invention.

Moving next to FIGS. 4A and 4B, further details of an exemplary mounting wedge having an extended finger geometry are illustrated in side elevation and top plan views respectively. Again, mounting wedge 160 is preferably adapted to be mounted to a corner of an associated HDD, such that mechanical shock damping can be provided for the HDD through the mounting wedge. Increased mechanical shock damping capabilities can be achieved where multiple mounting wedges are used in various strategic locations, such as on each corner of the HDD. As shown in FIGS. 4A and 4B, a plurality of extended fingers or finger type components 162 can be provided in a plurality of orthogonal or perpendicular directions. These finger type components 162 can form a first stage spring portion of the mounting wedge 160, with such a first stage spring portion providing initial damping of an external mechanical shock. In addition, a base or wedge block portion 161 can form a second stage spring portion of mounting wedge 160, with this second stage portion providing final damping of the mechanical shock. As such, the damping properties of the first and second stage spring portions are significantly different.

Various sets of finger components 162 can extend in parallel in multiple different perpendicular or orthogonal directions. For example, one set of finger components 163 can be arranged to damp shocks along an X-axis, another set of finger components 164 can be arranged to damp shocks along a Y-axis, and still another set of finger components 165 can be arranged to damp shocks along a Z-axis. As a result, any impinging mechanical shock force having X, Y and/or Z components to it will be damped appropriately by the finger components that extend in the respective X, Y and Z directions.

Figure 5A:
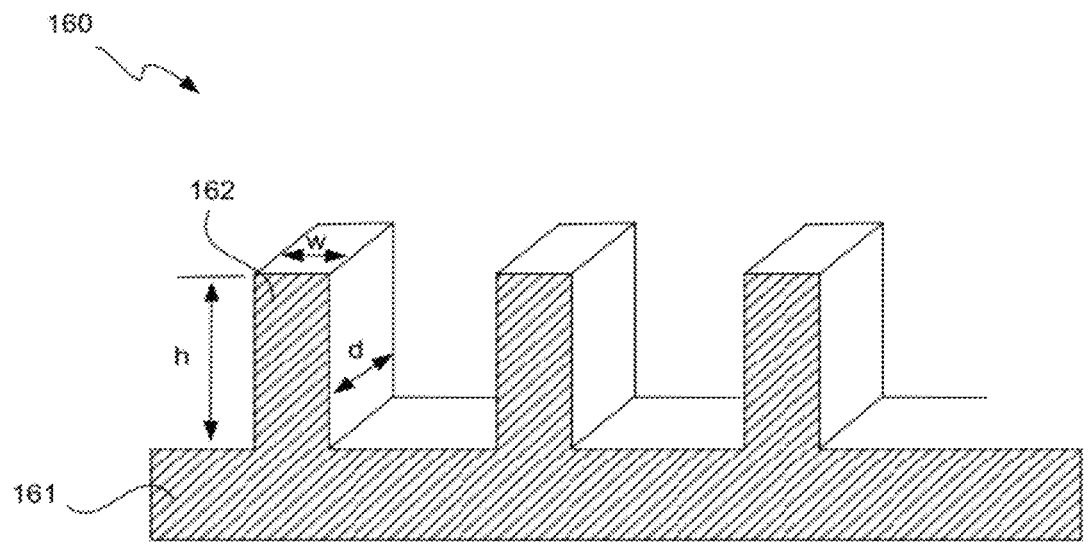
FIG. 5A illustrates in close-up and partially cutaway side perspective view the extended finger geometry of the exemplary mounting wedge of FIGS. 4A and 4B according to one embodiment of the present invention.

Continuing with FIG. 5A, the extended finger geometry of the exemplary mounting wedge of FIGS. 4A and 4B is shown in a close-up and partially cutaway side perspective view block diagram format. As shown, a given finger component 162 can extend from a base or wedge block portion 161 by a given height "h" when the overall mounting wedge 160 is in a normal state. The geometry of finger 162 can be generally rectangular or box shaped, and can also have a width "w" and depth "d." With the finger geometry and material composition being key to the first stage spring portion of the mounting wedge, the width, height, depth and spacing of the various finger portions can be varied to formulate a desired spring rate and compression (i.e., displacement) distance for shock absorption in the first stage spring portion fingers.

In general, a mechanical shock or other sudden physical force that impacts the associated portable device is damped by both of the two different stage spring portions of any impacted mounting wedges. The first stage spring portion (i.e., fingers 162) preferably provides a gentler shock response over a greater distance than the second stage spring portion (i.e., base portion 161), which tends to be more rigid. A relatively large displacement of the first stage spring portion can take place before non-linearity or over-compression of the first stage becomes significant and gives way to absorption by the second stage spring portion.

The height of the finger determines the effective displacement range for the first stage spring. The height of the finger can be maximized to achieve the maximum distance traveled and lowest peak acceleration in response to an incumbent outside mechanical shock force. In addition to providing secondary stage shock damping, the secondary spring or wedge block can also be used to ensure that the HDD does not bottom out and contact the enclosure housing. Thus, the stiffness of the secondary spring should be much higher than that of the first stage, while the linear range of the secondary spring should be much less than the first stage.

Figure 5B:
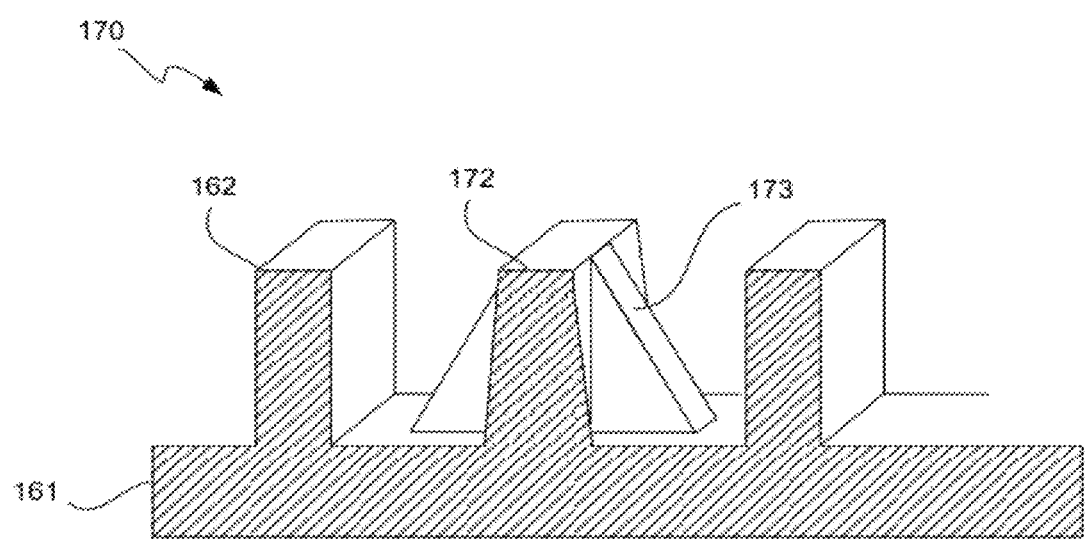
FIG. 5B illustrates an alternative extended finger geometry for a mounting wedge according to an alternative embodiment of the present invention.

FIG. 5B illustrates an alternative extended finger geometry for a mounting wedge according to an alternative embodiment of the present invention is provided in block diagram format. Alternative mounting wedge 170 can include a similar base portion 161 and one or more extended finger portions 162 identical or similar to the box-shaped finger portions described above. In addition to, or in lieu of regular extended finger portions 162, one or more alternatively shaped extended finger portions 172 can be used. Such alternative finger portions can take on a shape that is more quadrilateral or pyramid type in nature, and/or may have one or more side supporting fins 173. As will be readily appreciated, such side supporting fins 173 can provide lateral support to extended finger portion 172, such that a sideways buckling or collapse of the finger in the event of sudden and severe shocks is prevented. Such fin structures 173 can allow for the design of fingers having greater heights, since a buckling type failure is prevented.

Of course, other shapes, sizes and features for extended finger components may also be used, and it is specifically contemplated that any such geometries that result in a multiple stage mechanical shock damping process can be used. In some embodiments, for example, a finger on top a finger arrangement can be designed, such that first, second and third stage shock damping can be realized. In addition, various embodiments can include mounting wedges that are integrally formed, such that the various stage spring portions are all interconnected into a single device. Such mounting wedges might be formed by various injections molding techniques, for example, although other formation processes may also be used.

Mechanical Shock Damping

Figure 6:
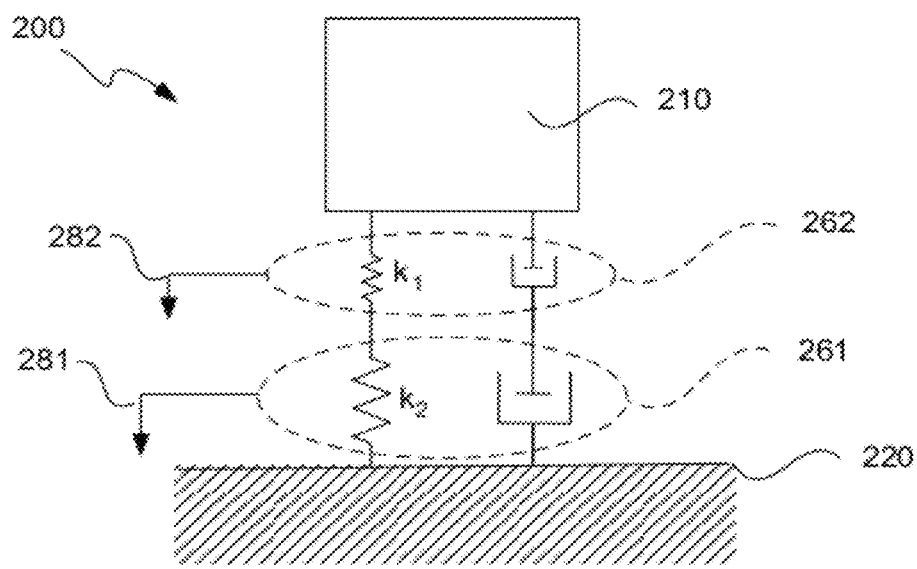
FIG. 6 illustrates in block diagram format the spring and damper effect found in a mounting wedge having the extended finger geometry of FIG. 5 according to one embodiment of the present invention.

Turning next to FIG. 6, a system illustrating the spring and damper effect found in a mounting wedge having the extended finger geometry of FIG. 5 is shown in block diagram format. System 200 can include a weight or mass 210 that is accelerated toward a wall or other object 220. Such a model represents what happens when an external mechanical shock accelerates an HDD toward the outer housing or wall of its associated portable device. A two stage damping mechanism between mass 210 and object 220 is represented by a first stage 262 having a first spring or damping constant $k_1$ and a second stage 261 having a second spring or damping constant $k_2$. This two stage damping mechanism represents what happens in the various mounting wedges described above.

Mechanically, the wedge and finger geometry can be described as a spring, damper, mass system that is linked in series, as shown. Such a system linked in series provides shock protection to the underlying HDD device and can be tune to provide shock responses specific to a particular HDD shock tolerance capability or specification. The mounting wedge finger component serves as the first stage spring or damper 262, where most of the mechanical shock or displacement is absorbed. The main body of the mounting wedge serves as the secondary spring or damper 261 that provides a higher stiffness but at a relatively lower compression distance.

Each stage also has a displacement distance range, with displacement range 282 corresponding to first stage 262 and displacement range 281 corresponding to second stage 261. In general, the displacement distance is the amount that a given spring stage is compressed or stretched during damping. For purposes of illustration, the provided mounting wedges can be compressed during displacement and damping. Again, a relatively large displacement 282 of the first stage 262 can take place before non-linearity or over-compression of the first stage becomes significant and gives way to absorption and displacement 281 by the second stage 261.

The finger based geometry stiffness and the base wedge based stiffness preferably limit the total HDD shock response displacement to less than the available sway space, which is the space between the HDD and the outer housing. Since the initial shock response displacement is mainly determined by the stiffness of the first stage finger based spring portion, the stiffness of the finger features are preferably designed to be much lower than the base wedge spring portion stiffness. Such a design results in a relatively lower initial shock response, and also results in the first stage finger portion being responsible for the majority of the mechanical shock absorption and mounting displacement realized by the mounting wedge. In various embodiments, the sway space between an HDD corner and the outer housing of an associated portable device can be on the order of about 2 millimeters or less.

Figure 7:
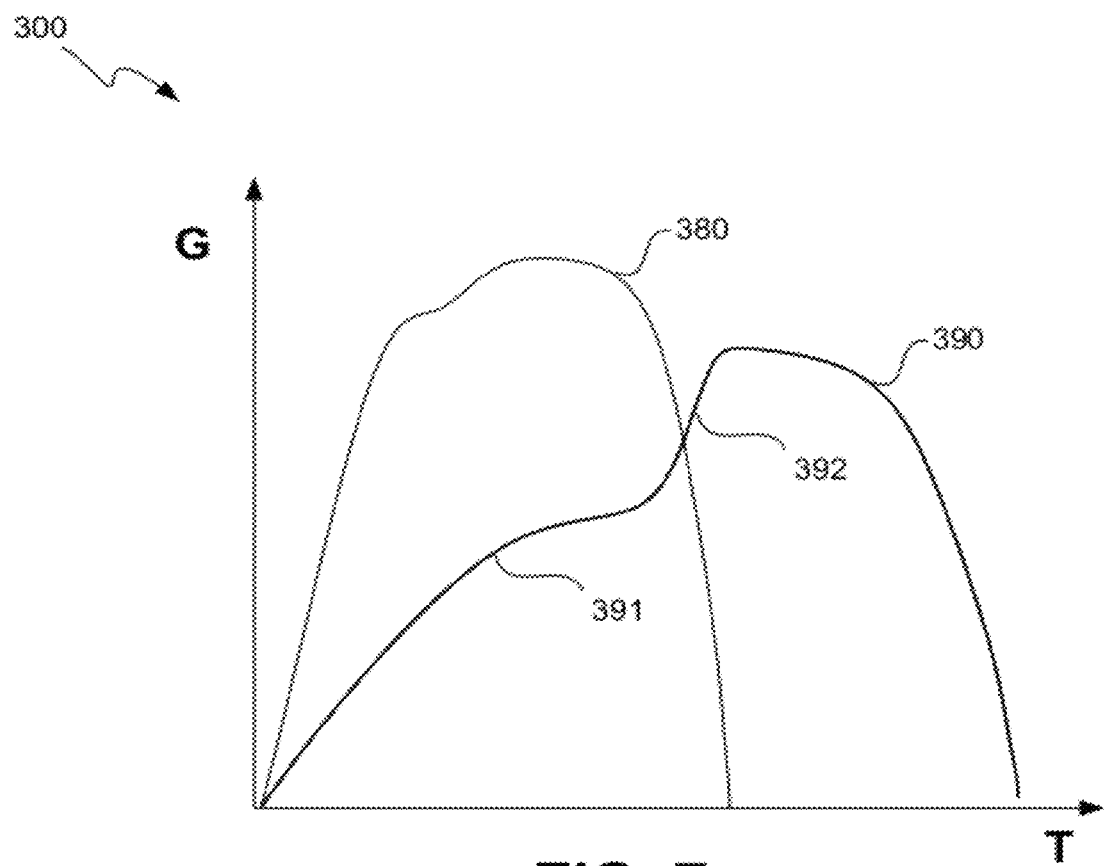
FIG. 7 illustrates a graph of mechanical shock over time realized by a traditionally mounted and damped HDD versus an HDD damped by mounting wedges having the finger geometry of FIG. 5 according to one embodiment of the present invention.

FIG. 7 illustrates a graph of mechanical shock over time realized by a traditionally mounted and damped HDD versus an HDD damped by mounting wedges having the finger geometry of FIG. 5. Graph 300 depicts the acceleration or G-force (G) experienced by an HDD over time (T) as a result of an external mechanical shock force to the HDD. Path 380 depicts the force experienced by a traditionally mounted and damped HDD for a given mechanical shock, while path 390 depicts the force experienced by an HDD that is damped by the mounting wedges described above with respect to the same given mechanical shock.

As shown, the rise in force experienced by an HDD mounted in a traditional manner (i.e., path 380) is relatively quick in comparison with the rise in force experienced by an HDD mounted and damped in the manner provided herein (i.e., path 390). Such a rapid rise in force results in higher G-force experienced by the traditionally mounted and damped HDD, which leads directly to device failure when the G-force becomes too high too quickly. Conversely, the G-force over time experienced by the HDD mounted and damped in the manner provided herein is significantly lower, due to the drawn out or delayed rise in force experienced over time. While the traditionally damped path 380 exhibits a rapid rise in G-force, the path 390 damped in the manner provided herein exhibits a slower rise in G-force. As shown, path 390 includes a first portion 391 that is dominated by the effects of the first stage spring, and a second portion 392 that is dominated by the effects of the second stage spring, as described above. In general, the finger based first stage damping and wedge block based second stage damping combine to provide a basis for shock pulse shaping, such as that which is reflected in path 390.

HDD mechanical shock robustness is typically described in terms of a maximum G force level tolerance in conjunction with a half sine pulse width specification. This information can be represented in the frequency domain SRS (shock response spectrum), and is generally specified by a given manufacturer for a particular HDD model or series. In various instances, there can be general industry standards as to what is an acceptable maximum G-force level tolerance for HDDs of a specific type or form factor. In some embodiments, various dimensions of the fingers and other portions of applied mounting wedges can be designed such that the maximum G-force level tolerance is not observed for a particular device.

The finger geometry determines the first stage spring stiffness. Desired spring stiffness can be formulated by designing finger geometry such that the desired shock response is within a given maximum G-force tolerance HDD specification. Similar concepts can be applied to ensure that the wedge block dual spring system results in a SRS that conforms to the maximum acceleration requirements for any specific sets of resonance frequencies. Some preliminary experimental results using the mounting wedges disclosed herein have found that a drop test shock to a 3.5 inch form factor HDD results in a measured shock level of less than about half of that which is measured in a traditionally mounted HDD. This is a substantial improvement over current shock absorption using traditional mounting techniques for portable devices having internal 3.5 inch form factor HDDs.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A portable electronic device, comprising:
   an outer housing configured to enclose and support one or more components;
   a component located within said outer housing; and
   a shock-absorption assembly located within said outer housing and coupled to said component, said shock-absorption assembly having one or more elements adapted to dampen a mechanical shock to said component, wherein said one or more shock-absorption assembly elements include a first portion comprising protrusions that provide initial damping of said mechanical shock and a second portion comprising an elastic block that provides final damping of said mechanical shock, wherein the protrusions extend between the elastic block and the component, and wherein the damping properties of said first and second portions are significantly different.

2. The portable electronic device of claim 1, wherein said shock-absorption assembly comprises a unibody mounting wedge frame.

3. The portable electronic device of claim 1, wherein said one or more shock-absorption assembly elements comprise a plurality of mounting wedges coupled to corners of said component, edges of said component, or both.

4. The portable electronic device of claim 1, wherein said one or more shock-absorption assembly elements are formed from a rubber or elastomer based material.

5. The portable electronic device of claim 1, wherein the first portion and second portion of said one or more shock-absorption assembly elements are both formed from the same material.

6. The portable electronic device of claim 1, wherein the protrusions of said first portion extend in a plurality of separate directions that are perpendicular to each other.

7. The portable electronic device of claim 1, wherein said first and second portions exhibit displacement distances during damping, and wherein the displacement distance exhibited by said first portion is greater than the displacement distance exhibited by said second portion.

8. A mounting assembly adapted for use with a storage device situated within an associated electronic device, the mounting assembly comprising:
   a first portion having a first spring property, said first portion comprising shock absorption elements that provide initial damping of a mechanical shock to the storage device; and
   a second portion having a second spring property, said second portion comprising an elastic block that provides final damping of said mechanical shock, wherein the damping properties of said first portion and said second portion are significantly different,
   wherein second portion defines a recess for accepting a portion of the storage device, and wherein the shock absorption elements extend between the elastic block and the storage device when the storage device is inserted into the recess.

9. The mounting assembly of claim 8, wherein said mounting assembly includes a plurality of separate components, and wherein each separate component includes its own said first portion and said second portion.

10. The mounting assembly of claim 8, wherein said first portion and said second portion are integrally formed within a single component.

11. The mounting assembly of claim 8, wherein the shock absorption elements of said first portion extend in three separate directions that are all mutually perpendicular with respect to each other.

12. The mounting assembly of claim 8, wherein said first and second portions exhibit displacement distances during damping, and wherein the displacement distance exhibited by said first portion is greater than the displacement distance exhibited by said second portion.

13. A shock absorbing device for use in supporting an internal component of an electronic device, the shock absorbing device comprising:
   an elastic block component having a first set of damping properties with respect to an external mechanical shock force; and
   at least one shock-absorbing element coupled to said elastic block component and extending therefrom, said at least one shock-absorbing element having a second set of damping properties with respect to said external mechanical shock force, wherein said first and second sets of damping properties are substantially different from each other, and wherein said shock absorbing device is adapted to be removably mounted to a corner or edge of an associated and separate internal component of an electronic device, and wherein the shock-absorbing elements extend between the elastic block and the internal component when the shock absorbing device is mounted to the internal component.

14. The shock absorbing device of claim 13, wherein said at least one shock-absorbing element extends in three separate directions that are all mutually perpendicular with respect to each other.

15. The shock absorbing device of claim 13, wherein said elastic block component provides final damping and said at least one shock-absorbing element provides initial damping of said mechanical shock force.

16. A portable computing device, comprising:
an outer housing configured to enclose and support one or more internal components;
an electro-mechanical storage device mounted within said outer housing; and
a mounting assembly located within said outer housing and coupled to said electro-mechanical storage device, said mounting assembly having one or more components adapted to dampen a mechanical shock to said electro-mechanical storage device, wherein at least one of said one or more mounting assembly components includes a first portion that provides initial damping of said mechanical shock and a second portion that provides final damping of said mechanical shock, wherein the components extend between the second portion and the electro-mechanical storage device, and wherein the damping properties of said first and second portions are significantly different.

17. The portable computing device of claim 16, wherein said first portion comprises an extended finger geometry and said second portion comprises an elastic block.

18. The portable computing device of claim 16, wherein said one or more components of said mounting assembly includes a separate component for each corner of said electro-mechanical storage device.

19. The portable computing device of claim 16, wherein said mounting assembly is mounted to said electro-mechanical storage device such that said electro-mechanical storage device is prevented from directly contacting said outer housing before, during and after said mechanical shock.

* * * * *